I. FOX.
EYEGLASS MOUNTING.
APPLICATION FILED FEB. 11, 1909.
1,006,742. Patented Oct. 24, 1911.
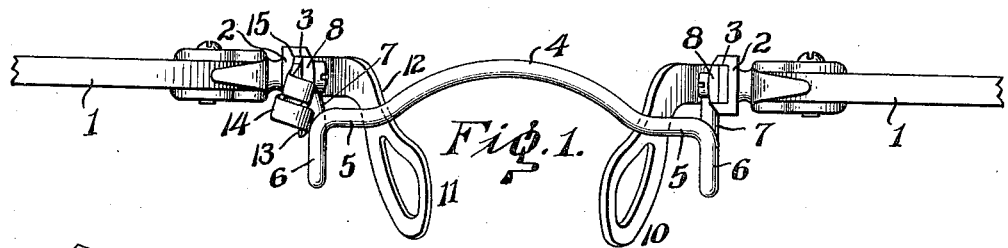
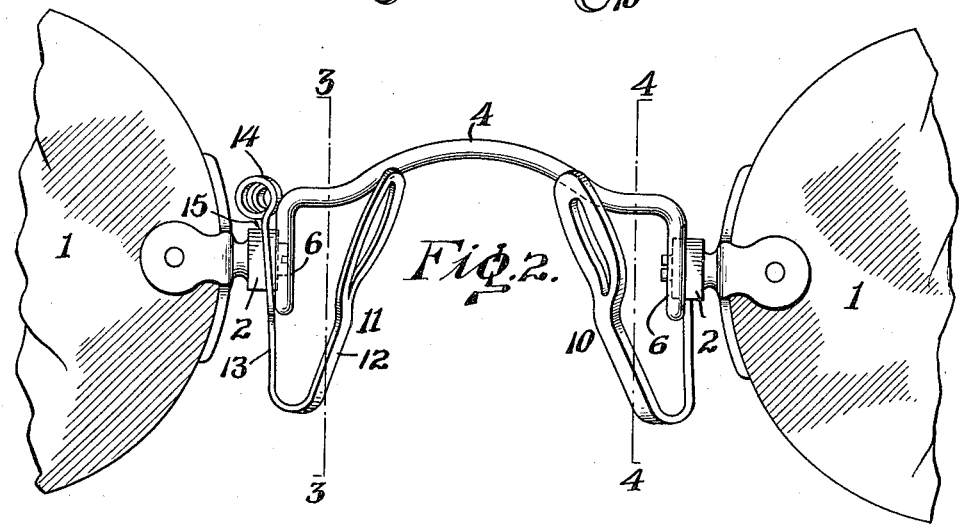
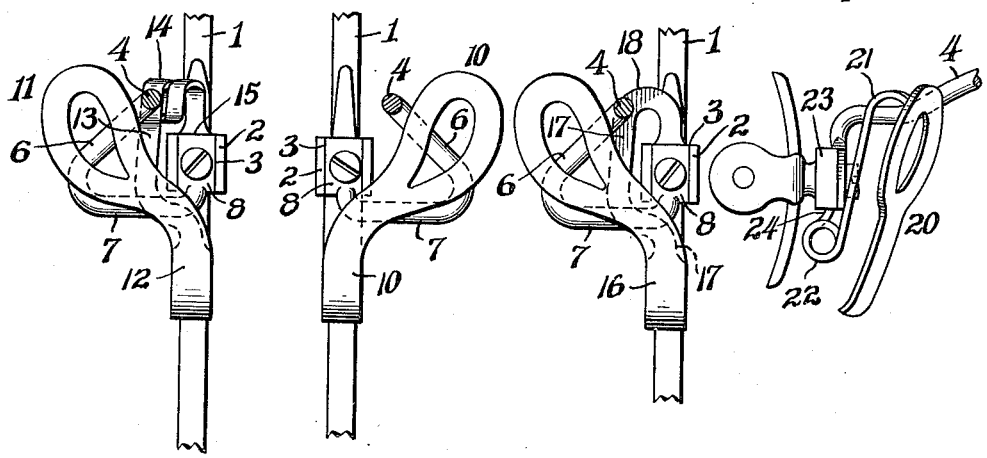
WITNESSES
INVENTOR

UNITED STATES PATENT OFFICE.

IVAN FOX, OF MEDIA, PENNSYLVANIA.

EYEGLASS-MOUNTING.

1,006,742. Specification of Letters Patent. Patented Oct. 24, 1911.

Application filed February 11, 1909. Serial No. 477,405.

*To all whom it may concern:*

Be it known that I, IVAN FOX, a citizen of the United States, residing at Media, in the county of Delaware, State of Pennsylvania, have invented certain new and useful Improvements in Eyeglass-Mountings, of which the following is a specification.

My invention relates to improvements in eye-glass mountings.

It has for its object to provide improved means for supporting eye-glasses upon the nose and it is particularly adapted for use in connection with eye-glasses in which the lenses are connected together by a bridge which is adapted to and preferably does, but need not, rest upon the nose of the wearer.

It provides means whereby after one support, that is, the nose piece or pieces on one side is or are placed against the nose, the nose piece or pieces on the other side may be carried into position against the nose.

My invention contemplates that the nose piece or pieces or support of whatever character, connected to one lens shall be more rigid than the nose piece or support which is connected to the other lens.

Other objects and advantages of my invention will appear in the detailed description thereof.

A convenient embodiment of my invention is illustrated in the accompanying drawings but changes in the details of construction shown may be made within the scope of the claims without departing from my invention.

In the drawings:—Figure 1 is a top plan view of a pair of eye-glasses provided with my invention; Fig. 2 is a rear elevation of the same; Fig. 3 is a section on the line 3—3 of Fig. 2; Fig. 4 is a section on the line 4—4 of Fig. 2; Fig. 5 is a section corresponding to Fig. 3 but showing a modified construction of arm connecting the nose piece to the lens; and Fig. 6 is a rear view of one end portion of a bridge and the mounting connected thereto showing a modified construction of my invention.

Referring to the drawings:—1 designates the lenses of a pair of eye-glasses having posts or standards 2 of usual construction connected thereto, the said posts being provided with vertical housings 3 for the reception of the opposite ends of the bridge 4 and also for the reception of means for supporting the nose pieces. While the housings 3 are shown as vertical that is to say lying in the plane of the lenses, it is to be understood that my invention may be employed in connection with posts having housings extending therethrough transversely of the plane of the lenses.

In eye-glasses provided with my invention, the bridge preferably rests upon the nose and is not so bowed or constructed as to exert a spring action for holding the glasses on the nose because the glasses are not intended to be held upon the nose by the spring action of the bridge, as is usual, but by the spring action of one of the nose pieces or supports as will be hereinafter more fully set forth. The central portion of the bridge is bowed outwardy to form a seat adapted to rest upon the nose, although, as hereinbefore stated, the bridge need not necessarily rest upon the nose. Portions 5 are connected with the opposite ends of the bowed portion 4 of the bridge and extend in a direction substantially parallel to the plane of the lenses and beyond these portions 5 there are portions 6 which extend downwardly and to the rear forming angles with the portions 5. Beyond the portions 6 are portions 7 which extend forwardly toward the front of the lenses and extending from these portions are portions 8 which extend into the housings 3 of the posts 2. The purpose of providing the angles between the portions 5 and 6 will be referred to farther on in this specification.

10 designates a nose piece of the construction of the nose piece shown and claimed in the patent granted to me under date March 18, 1902, No. 695,681. This nose piece 10 is capable of adjustment so as to properly locate and adjust the lens to which it is connected with respect to the eye and with respect to the nose of the person on whom the glasses are being fitted. After once fitting this lens to the eye, the said nose piece 10 is intended to be left stationary and thereafter the adjustment of the glasses to the nose is effected by adjusting the opposite nose piece.

The nose piece opposite the nose piece 10 is designated as a whole by 11. Preferably it is of lighter weight or at least is much more resilient than the nose piece 10. It, as in the case with the nose piece 10, is of U-shape,—the part 12 thereof being located inside the portions 6 and 7 and the part 13 thereof being located on the outside of said parts 6 and 7. The part 13 is one of the legs of the U-shaped nose piece 11 and it constitutes a leg or arm which is extended to a point above one of the posts 2 where coils 14 are provided therein to secure the necessary resilience and spring action. From these coils an extension of the part 13 is carried downwardly into the housing 3 of the adjacent post 2 as shown at 15. Although I have shown the nose piece 11 as a whole of lighter weight and more resilient than the nose piece 10, I may construct the nose piece 11 with the part 12 thereof of the same thickness and rigidity as the corresponding part of the nose piece 10, because substantially all of the resiliency and spring action of the said nose piece 11 are provided for in the part 13 and coil 14 thereof. The coil consists of two turns in the construction shown, but the number of turns may be increased or diminished as desired. By reason of the fact that it is principally by the spring action of the leg or arm 13 and the coil 14 that the glasses are held upon the nose, it is necessary that normally the bearing portion 12 of the nose piece 11 shall extend farther in toward the center of the bridge than the nose piece 10. By providing the angles between the portions 5 and 6 I provide a space to permit the outward movement of the bearing portions of the nose pieces 10 and 11.

In Fig. 5 I have shown a nose piece 16 in which, as in the nose piece 11, the part 17 constitutes a leg or arm for connecting sadi nose piece to the post or standard 2. In this construction the upper end of the leg or connecting arm 17 is provided with a single forward bend 18 edgewise of the material, the said bend being located at the upper end of the said leg or arm 17. The end of the said leg portion 17 extends from the bend 18 downwardly into the housing 3 in the adjacent post or standard 2 in the same manner as in Figs. 1, 2 and 3 of the drawings.

In Fig. 6 I have shown a construction embodying my invention in which the nose piece 20 is provided with a part 21 which is bent and extended downwardy from the upper end of the nose bearing or pad part 20 of the nose piece to a point below the post or standard 2 and is provided with coils 22, the end of the last coil being extended into the bottom of the housing in the post or standard 23 as indicated at 24 in said Fig. 6. The number of turns in the coils 22 may be increased or diminished as desired.

In the several forms of construction the bearing parts or pad parts of the nose pieces are provided with enlarged portions at their upper end having a perforation therethrough and a smaller or narrower portion at the lower end as in the patent aforesaid granted to me.

The principle of my invention is found in all the forms illustrated and the differences as illustrated relate to matters of detail and in no way affect or alter the broad idea of my invention.

In the several forms of construction, the angular spaces between the portions 5 and 6 of the bridge provide opportunity for the nose pieces to be moved toward and from the lenses that is to say in and out in the usual manner.

In use as already indicated, the more rigid of the nose pieces or supports is first adjusted to the nose and with relation to the lens so that the lens to which it is connected is properly positioned with relation to the eye. This having been done, the opposite more resilient nose piece and the lens to which it is connected are adjusted in the proper relation to the eye. The inner bearing or pad portion of the more resilient nose piece is positioned sufficiently close to the first-named nose piece to occasion spring pressure upon the sides of the nose to hold the glasses in position.

By my invention I provide a construction which when once adjusted is very unlikely to become distorted or bent so as to destroy the correct and accurate adjustment previously given in the adjustment of the glasses to the eyes.

In the two forms of construction shown in Figs. 1 to 3 and Fig. 5, the coil 14 and the bend 18 are located above the post or standard 2 and their relative positions with respect to the other parts of the nose piece including the bearing or pad portions and the leg or arm portions are such that in case of pressure against the upper end of the part 12 to occasion bending of the bend or bight connecting the parts 12 and 13 or 12 and 17 and at the same time occasion a movement of the part 13 or the part 17, as the case may be, the upper and lower portions of the bearing or pad parts in the two forms of construction move in substantially parallel lines which is a desirable feature. In Fig. 6 the same action takes place by reason of the fact that the bends or coils 22 are located in the same relative position below the post or standard 2 as the coils 14 and the bend 18 are located above the standard while the upper portion of the leg or arm 21 is located in the same relative position above the posts or standards 2, as the lower portions of the legs or arms 13 and 17 are located below the said post or standard. The same principle of operation is present in all the constructions shown.

In the several forms of my construction, the more resilient nose piece is adapted to adjust itself to the bearing or pad portion of the more rigid nose piece when the latter is resting against the nose; that is to say, the rigid nose piece is substantially stationary or immovable with respect to the structure as a whole, whereas the more resilient nose piece, by reason of its resiliency, adapts itself to the rigid nose piece and assumes a firm holding position against the side of the nose opposite that on which the rigid nose piece rests and by reason of this resiliency the said resilient nose piece assumes a symmetrical position against the nose with respect to the bearing portion of the said rigid nose piece. The resiliency of the said resilient nose piece is provided for not only in the coils, one of which in Figs. 1 to 3 of the drawings is designatel by the reference numeral 14, but is also provided for in the arm 13 of said Figs. 1 to 3 and is also provided for in the bend connecting the arm 13 with the bearing portion or pad 12 of the said resilient nose piece. One of the essential characteristics of my invention is that one of the nose pieces shall be substantially stationary with respect to the remainder of the construction after having been once adjusted, while the other nose piece is resilient and is capable of adjusting itself to a symmetrical position with respect to the said stationary rigid nose pieces and supplies the spring action by means of which the glasses are held and supported upon the nose.

Having thus described my invention, I claim:—

1. In eye-glasses, in combination, the lenses, means for connecting the said lenses, nose pieces also connected to the said lenses, one of the said nose pieces being more rigid and offering greater resistance to being bent than the other of said nose pieces.

2. In eye-glasses, in combination, the lenses, means for connecting the said lenses together, nose pieces for supporting the eyeglasses upon the nose, the said nose pieces comprising nose bearing portions and supporting arms for connecting the said nose bearing portions to the lenses, the supporting arm for connecting one of the said nose bearing portions to a lens being more resilient than the supporting arm for connecting the other nose bearing portion to its adjacent lens.

3. In eye-glasses, in combination, the lenses, a bridge connecting the said lenses, the said bridge having a central curved portion adapted to rest upon the nose, portions at the opposite ends of the said curved portion extending in the direction of the plane of the said lenses, and portions extending rearwardly from the said last named portions, nose pieces connected to the said lenses, the bearing portions of the said nose pieces being adapted to move into the angles between the second and third named portions.

4. In eye-glasses, in combination, the lenses, a bridge connecting the said lenses, the said bridge having a central curved portion adapted to rest upon the nose, portions at the opposite ends of the said curved portion extending in the direction of the plane of the said lenses, and portions extending rearwardly from the said last named portions, nose pieces connected to the said lenses, the bearing portions of the said nose pieces being adapted to move into the angles between the second and third named portions, one of the said nose pieces being of greater rigidity than the other of said nose pieces.

5. In eye-glasses, in combination, the lenses, means for connecting the said lenses, nose pieces also connected to the said lenses, the said nose pieces having supporting arms which extend from the bearing portions thereof toward the lenses to be connected thereto and the supporting arm of one of the said nose pieces being provided with a bend whereby it is rendered more resilient than the other of said nose pieces.

6. In eye-glasses, in combination, the lenses, posts or standards connected to the said lenses, means secured to the said posts or standards to connect the said lenses together, nose pieces having arms for connection to the said posts or standards, the arms of one of the said nose pieces extending directly from its point of connection to the bearing portion of the nose piece to the post or standard to which it is connected, and the arm of the other of said nose pieces extending from its point of connection to the bearing portion of its nose piece to a point beyond the said post or standard where it is provided with bends, and the said arm being extended from the said bends to the said post or standard to which it is connected.

7. In eye-glasses, the combination of the lenses, posts or standards connected to the said lenses, means for connecting the said posts or standards to each other, nose pieces, the said nose pieces having bearing portions and supporting arms connected to the said bearing portions and to the said posts or standards, the arm from one of the said nose pieces extending directly to the said post or standard and the arm from the other of said nose pieces extending from the said nose pieces to a point beyond the said post or standard where it is provided with a coil and from which coil the said arm extends to the post or standard to which it is connected, the latter of the said nose pieces being more resilient than the other one of said nose pieces.

8. In eye-glasses, the combination of the lenses, means for connecting the said lenses, U-shaped nose pieces, one side of each of the said U-shaped nose pieces constituting a bearing surface and the other side or leg of one of the said pieces extending directly upwardly to its point of connection with the said lens, and the other side of the other of said pieces extending upwardly to a point above its connection with the lens to which it is connected where it is provided with a coil from which coil the said side extends downwardly to its point of connection with the said lens.

9. In eye-glasses, in combination, the lenses, a rigid bridge for connecting the said lenses, nose pieces, one of which is relatively resilient with respect to the other, the more resilient of the said nose pieces being adapted to be placed against one side of the nose and to bend to permit the other more rigid nose piece to be carried into position against the other side of the nose.

10. In eye-glasses, in combination, the lenses, a bridge for connecting the said lenses, nose pieces one of which is relatively resilient with respect to the other, the nose bearing portion of the said resilient nose piece being adapted to be adjusted against the nose and in symmetrical relation with respect to the bearing surface of the rigid nose piece, and the said resilient nose piece supplying the spring pressure by means of which the glasses are secured to and held upon the nose.

11. In eye-glasses, in combination, the lenses, a bridge for connecting the lenses, nose pieces connected to the said lenses one of the said nose pieces being rigid while the other of said nose pieces is resilient, the resilient nose piece comprising an arm by means of which it is connected to the said lenses, the said arm being provided with a coil and the said resiliency being occasioned by the presence of the said coil, by the arm, and by the connecting bend between the bearing portion of the said nose piece and the said arm, whereby the bearing portion of the said resilient nose piece is adapted to adjust itself in relation to the bearing portion or pad of the said rigid nose piece.

In testimony that I claim the foregoing as my invention, I have hereunto signed my name this 10th day of February, A. D. 1909.

IVAN FOX.

In the presence of—
S. SALOME BROOKE,
CYRUS N. ANDERSON.